(12) United States Patent
Lake

(10) Patent No.: US 6,517,052 B1
(45) Date of Patent: Feb. 11, 2003

(54) INSTALLATION TOOL SYSTEM FOR POLE-MOUNTED COMMUNICATION CABLES

(76) Inventor: Marvin Lake, 218 W. Riverside Ave., Kellogg, ID (US) 83837

( * ) Notice: Subject to any disclaimer, the term of this patent is extended or adjusted under 35 U.S.C. 154(b) by 0 days.

(21) Appl. No.: 09/821,349

(22) Filed: Mar. 29, 2001

(51) Int. Cl.⁷ .................................................. H02G 1/08
(52) U.S. Cl. ........................ 254/134.3 PA; 254/134.3 R
(58) Field of Search ................................. 254/134.3 PA, 254/403, 134.3 R, 411, 134.3 CL

(56) References Cited

U.S. PATENT DOCUMENTS

| | | | |
|---|---|---|---|
| 1,878,859 A | 9/1932 | Knabenshine | |
| 2,202,184 A | 5/1940 | Berger | |
| 2,858,106 A | 10/1958 | Anton | |
| 2,946,559 A | * 7/1960 | Pickett | ............... 254/134.3 PA |
| 3,162,992 A | 12/1964 | Davis | |
| 3,185,444 A | 5/1965 | Eitel | |
| 3,407,011 A | * 10/1968 | Zeidler | ............... 254/134.3 PA |
| 3,545,724 A | * 12/1970 | Wright | ............... 254/134.3 PA |
| 5,040,771 A | 8/1991 | Spell | |
| 5,064,172 A | * 11/1991 | Hereford | ............ 254/134.3 PA |
| 5,727,777 A | 3/1998 | Chikiri et al. | |
| 5,941,507 A | 8/1999 | Page | |

* cited by examiner

*Primary Examiner*—Lee Wilson
(74) *Attorney, Agent, or Firm*—John D. Gugliotta

(57) ABSTRACT

A system and method for use in the installation of cable between support poles and other structures is provided including brackets, support rollers, clamps, pins, and pulleys that are used to support, guide, and pull such cables during the installation process. The installation tools also allow for the securement of the communication cables to messenger cables which support the communication cables during mid-span runs. The system also utilizes a series of modular pulleys that allow for installation of the cable along pole lines including inside and outside corners. A rope is simply threaded through the various components and the cable is then pulled in using a standard winch, without the necessity of a lift truck that requires a worker to work for extended periods of time at an elevated height. Such installation practices as performed by the present invention allow copper and fiber-based communication cables to be installed safely to reference to the cable integrity as well as to the worker.

16 Claims, 12 Drawing Sheets

INSTALLATION TOOL SYSTEM FOR POLE-MOUNTED COMMUNICATION CABLES

RELATED APPLICATIONS AND DISCLOSURES

The present invention was first disclosed in the Disclosure Document 465,792 filed on Nov. 11, 1999. There have been no previously filed, nor any co-pending applications, anywhere in the world.

BACKGROUND OF THE INVENTION

1. Field of the Invention

The present invention relates generally to cable installation tools, and, more particularly, to an installation tool system for pole-mounted communication cables.

2. Description of the Related Art

Recent advances in communication technology such as cable television, the Internet, videophony, and the like has led to massive upgrade in the cable infrastructure mounted on outdoor poles necessary to support such devices. What was just a few years ago limited to just a few telephone lines has now been replaced with many telephone lines, cable televison coaxial cable, broadband communication cabling, fiber optic links, and high speed data access lines just to name a few. While each new method of cabling that comes along is generally smaller and more efficient than the one it replaces, it does not mean that it is easier to install. In fact, with the smaller cable, factors such as pulling tension, bend radiuses, susceptibility to damage and others, actually make the cable more difficult to install on outdoor poles. In fact, should some cables be accidentally kinked during installation, they become damaged so severely that they will not function and must be replaced. With this in mind, old technology tools that have been used to install conventional copper cabling in the past is no longer effective to perform the task of installing these new generation of communication cables. Accordingly, there is a need for a means by which newer types of communication cables can be installed on outdoor mounted poles in a manner which is quick, easy and efficient without risk of damaging such cables.

In the related art, several devices are disclosed that describe devices and systems for the installation of electrical cables. U.S. Pat. No. 5,941,507 issued in the name of Page discloses a cable installation guide. U.S. Pat. No. 5,727,777 issued in the name of Chikiri et al. discloses a spiral hangar for a cable and method of installing cable and using the same. U.S. Pat. No. 5,040,771 issued in the name of Spell discloses an overlash jig. U.S. Pat. No. 3,185,444 issued in the name of Eitel discloses a method of installing cable on an existing messenger. U.S. Pat. No. 3,162,992 issued in the name of Davis discloses a cable installing and wrapping apparatus. U.S. Pat. No. 2,858,106 issued in the name of Anton discloses a guide for flexible lines. U.S. Pat. No. 2,202,184 issued in the name of Berger discloses a pulley block. U.S. Pat. No. 1,878,859 issued in the name of Knabenshue discloses an electric wire stretcher.

A search of the prior art did not disclose any patents that anticipate directly many features of the instant invention. Consequently, a need has been felt for providing a new system of installation tools for the installation of newer generation communication cables on outdoor poles and other structures that allow such cables to be supported in mid air.

SUMMARY OF THE INVENTION

It is therefore an object of the present invention to provide an improved installation tool system for pole-mounted communication cables that provides a functional method for the installation of copper-based and fiber-optic type communication cables.

Briefly described according to the preferred embodiment of the present invention, a system and method for use in the installation of cable between support poles and other structures is disclosed. The invention consists of many different tools such as brackets, support rollers, clamps, pins, and pulleys that are used to support, guide, and pull such cables during the installation process. The installation tools also allow for the securement of the communication cables to messenger cables which support the communication cables during mid-span runs. The system also utilizes a series of modular pulleys that allow for installation of the cable along pole lines including inside and outside corners. A rope is simply threaded through the various invention components and the cable is then pulled in using a standard winch, without the necessity of a lift truck or other means that requires a worker to work for extended periods of time at an elevated height. Such installation practices as performed by the present invention allow copper and fiber-based communication cables to be installed safely in reference to the cable integrity as well as to the worker.

It is another object of the present invention to provide an improved installation tool system for pole-mounted communication cables that can easily be transported, set-up and utilized at any job site in a quick, easy and effective manner.

It is another object of the present invention to provide an installation tool system for pole-mounted communication cables that works with all types of copper and fiber-based communication cables including telephone cable, data cable, coaxial cable, shielded cable, multiconductor twisted pair cable, single strand fiber optic cable, multi-strand fiber optic cable and the like.

It is another object of the present invention to provide an installation tool system for pole-mounted communication cables that is easy to use and operate in a manner which is intuitively obvious to all that may use it.

It is another object of the present invention to provide an installation tool system for pole-mounted communication cables that does not subject installed cables to over tension, kinking, excessive bend radiuses and the like during the installation process.

It is another object of the present invention to provide an installation tool system for pole-mounted communication cables that is modular in nature and may be adapted in the field to suit the particular installation conditions.

It is a feature of the present invention to provide an installation tool system for pole-mounted communication cables that is inherently more cost-effective and safer than traditional methods of cable installation at elevated heights.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

In order to describe the complete relationship of the invention, it is essential that some description be given to the manner and practice of current installation of cable. As such, utility poles are commonly used to carry communication lines of any type used for the purpose of carrying communication signals (telephone, television, etc.). An entire run of communication cable comprises the overall distance over which the communication lines are to be installed at one time, with individual spans being the distance from one utility pole to the next. A messenger is put in position between spans, and comprises a ¼ inch or ⁵⁄₁₆ inch steel cable used to support the communication line, which is lashed thereto for support. As such, the communication line itself is not self-supporting.

In view of this manner and practice current in the art, the best mode for carrying out the invention is presented in terms of its preferred embodiments for use at span-end locations, as well as mid-span locations. Herein depicted within the FIGS. 1 through 12, which depict the various components adaptable to span-end elements, with FIG. 13 through FIG. 15 depicting the various components adaptable to mid-span elements comprising the overall system disclosed herein.

1. Detailed Description of the FIGS. 1–12, Span-End Elements

Figure 1:
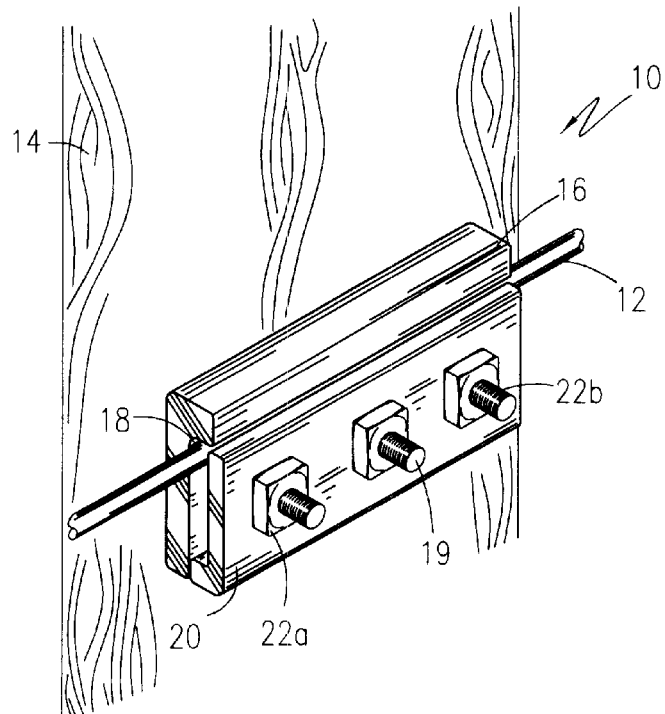
FIG. 1 is a perspective view of a messenger clamp 10 as used with the installation tool system for pole-mounted communication cables of the present invention.

Referring now to FIG. 1, a perspective view of a messenger clamp 10 for use in affixing a conventional messenger cable 12 to a conventional utility pole 14. The clamp 10 forms a horizontally elongated messenger clamp housing 16 forming a messenger receiving conduit 18 for allowing passage of the messenger 12 laterally therethrough. A pole support bolt 19 affixes the clamp housing 16 to the pole 14, and in its preferred embodiment consists of a ⅝ inch bolt penetrating the horizontal center of the housing 16. An impingement blade 20 mates to the outer surface of the housing 16 and forms a physical retention means to prevent the messenger 12 from releasing from the conduit 18. A first messenger retaining bolt 22a and second messenger retaining bolt 22b penetrate both the housing 16 and blade 20 to provide a physical impingement therebetween. In their preferred embodiment, both the first messenger retaining bolt 22a and second messenger retaining bolt 22b consist of a ½ inch bolt. Because of this differential in size, accidental confusion during installation or removal of the supporting means for the clamp 10 and impingement means for the messenger 12 can be limited.

Figure 2:
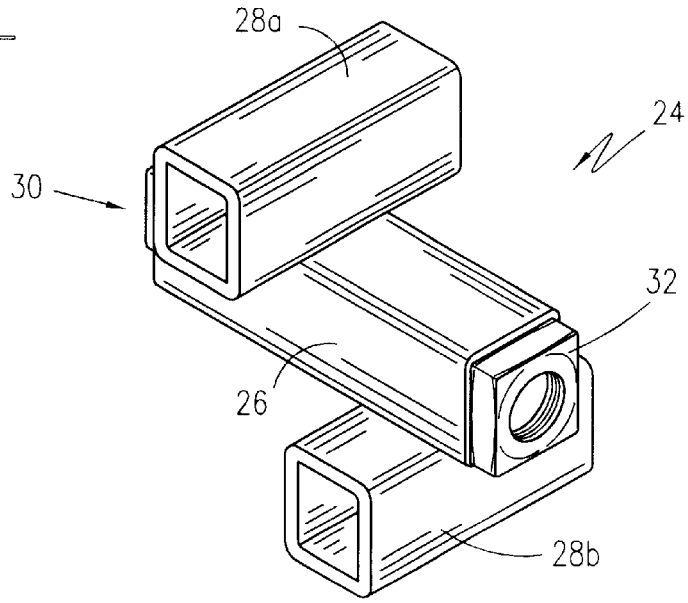
FIG. 2 is a perspective view of hanger bracket 24 as used with the installation tool system for pole-mounted communication cables of the present invention.

Referring now to FIG. 2, a perspective view of a hanger bracket 24 is shown, anticipated as being attached directly to a messenger clamp 10 for providing structural attachment a conventional utility pole 14. A horizontally elongated bracket body 26 is shown formed of square tube stock supporting a first support channel 28a on an upper surface aligned perpendicularly to the lateral centerline of the body 26. A second support channel 28b is supported by the body 26 on a lower surface, similarly aligned perpendicularly to the lateral centerline of the body 26. Attached at one lateral end of the body 26 is a first attachment means 30, and attached at the opposite lateral end of the body 26 is a second attachment means 32. It is envisioned that the first attachment means 30 comprises a conventional threaded nut capable of engaging a ½ inch bolt. Similarly, the second attachment means 32 comprises a conventional threaded nut capable of engaging a ⅝ inch bolt.

Figure 3A:
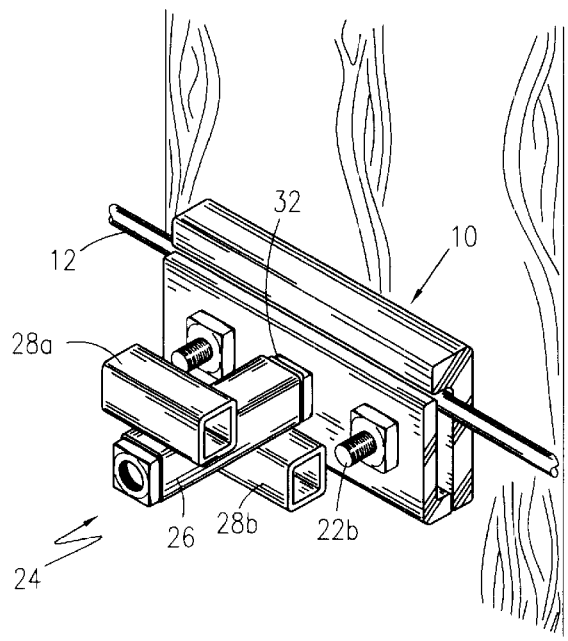
FIG. 3a and FIG. 3b are perspective views of a hanger bracket 24 affixed to a messenger clamp 10 as used with the installation tool system for pole-mounted communication cables of the present invention.
Figure 3B:
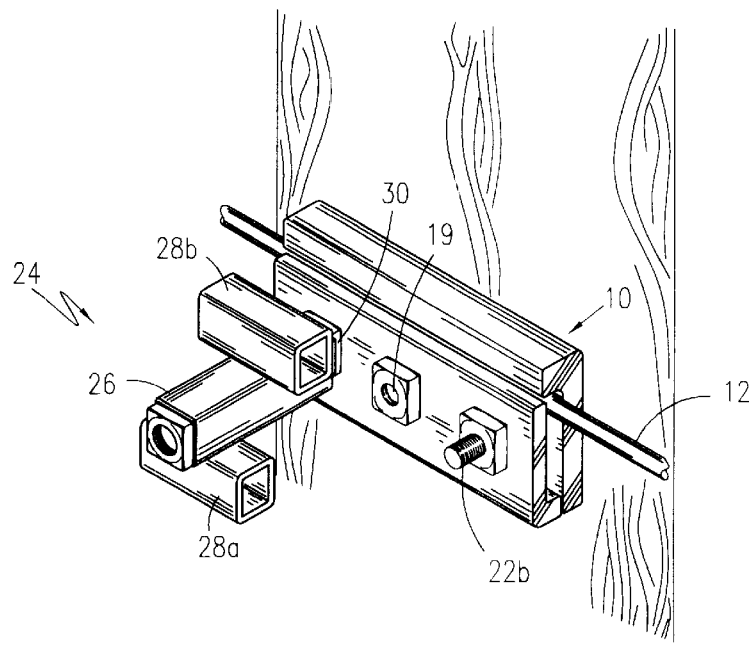

In conjunction with FIG. 3a and FIG. 3b, attachment and support of a hanger bracket 24 to a messenger clamp 10 is shown in a bi-directional configuration, respectively. As indicated, it is envisioned that the first attachment means 30 would be capable of engagement with and attachment to either the first messenger retaining bolt 22a or second messenger retaining bolt 22b. Similarly, the second attachment means 32 would be capable of engagement with and attachment to the pole support bolt 19. In this manner, adaptive and bi-directional support can be easily obtained at any utility pole 14 to which a messenger clamp 10 is affixed.

Figure 4:
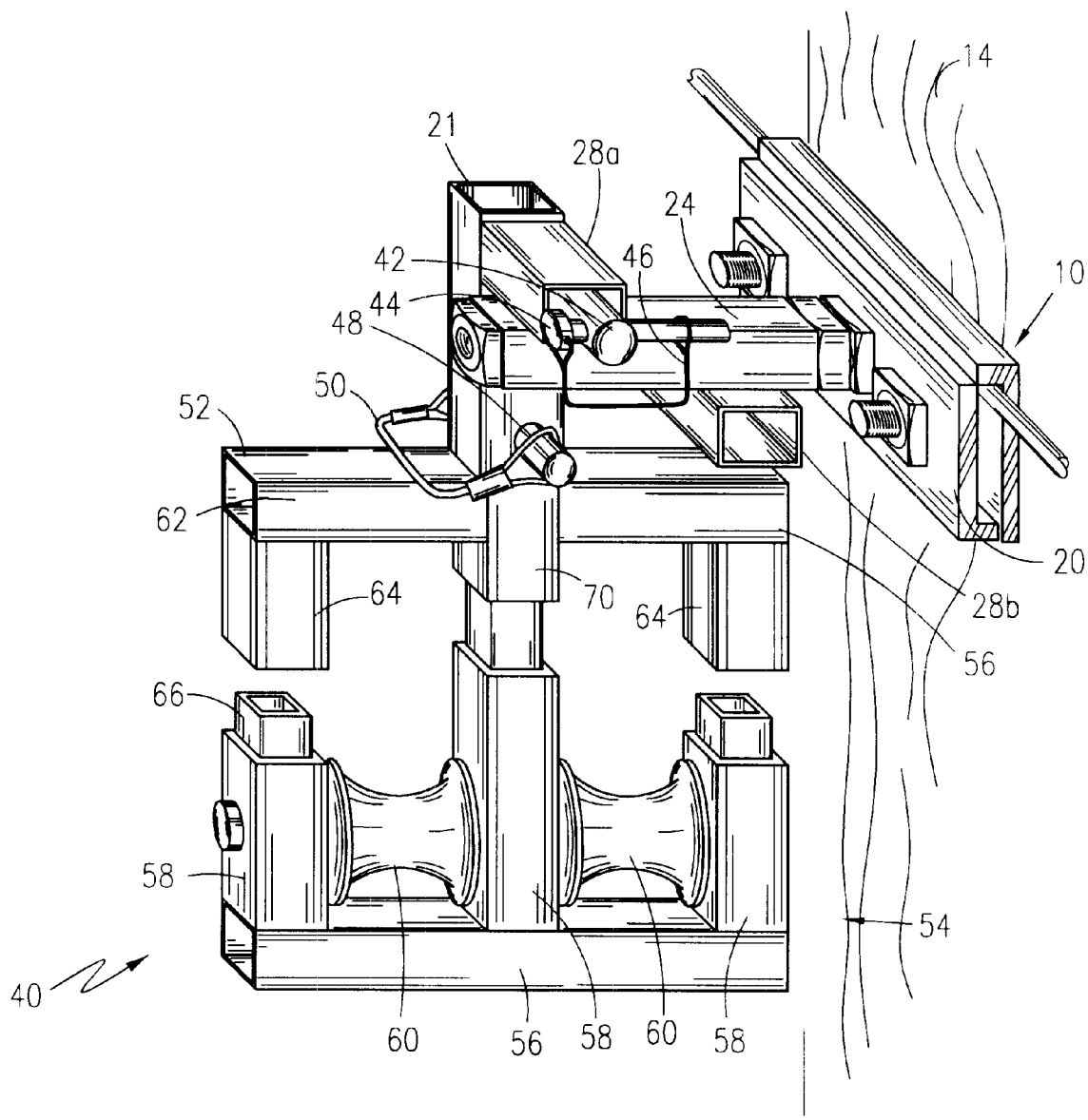
FIG. 4 is a perspective view of a double roller system 40 for attachment to a hanger bracket 24 as used with the installation tool system for pole-mounted communication cables of the present invention.

Referring now to FIG. 4, a perspective view of a double side-by-side roller assembly 40 as mounted and secured by the hanger bracket 24 as disclosed. The hanger bracket 24 is shown being attached to a messenger clamp 10 affixed to a pole 14, similar to that shown in FIG. 3A and FIG. 3B. The support channel 28a (or, alternately, 28b), receives and retains an attachment pin 44 is shown protruding from the square attachment connectors 21 and secured by the use of a first key pin 44 and a first locking pin 46. The first key pin 44 and the first locking pin 46 are shown here as the type well known and readily available, but those familiar with the existing art can readily see that other forms of locking and securing methods can also be used and thus should not be seen as a limiting factor.

This attachment pin 42 in combination with the first key pin 44 affixes the roller assembly 40 removably to a hanger bracket 24.

Extending downward from the attachment pin 42 is a double side-by-side frame 52. This frame 52 is designed to allow for passage and pulling of communication cable an/or an associated pulling rope, as will be described in greater detail herein.

As shown, the frame 52 comprises a lower roller assembly 54 engaging with an upper clamping assembly 56. The lower roller assembly 54 comprises a lower frame member 56 supporting a trio of parallelly spaced, upwardly projecting roller supports 58 that support a pair of rotatable rollers 60 secured thereto in a conventional manner, herein shown as by a roller retaining bolt. The upper clamping assembly 56 comprises an upper frame member 62 supporting a pair of parallelly spaced, downwardly projecting roller closures 64. Each roller closure 64 engages with an aligned roller support 58. In greater detail, the outermost roller supports 58 extend upward with an insertion tab 66 that extends into a hollow chamber within the roller closures 64. A guide means, such as a fitted shoulder, can result in positive engagement and closure of the lower roller assembly 54, thereby preventing any lateral slippage during the physical act of stringing communication cable. A center guide support 70 allows for the lower roller assembly 54 to slidably engage with the upper clamping assembly 56. A second key pin 48 and a second locking pin 50, identical in features and function to the first key pin 44 and the first locking pin 46, provide a fastening means to secure the lower roller assembly 54 to the upper clamping assembly 56.

This physical relationship produces a pair of cable openings through which communication cables (not shown in this FIG.) are routed and pulled through while it is being installed. The cylindrical nature of the roller 60 produces little friction between itself and the cable, thus allowing for ease of installation and reduced risk of damage to the cable.

Figure 5:
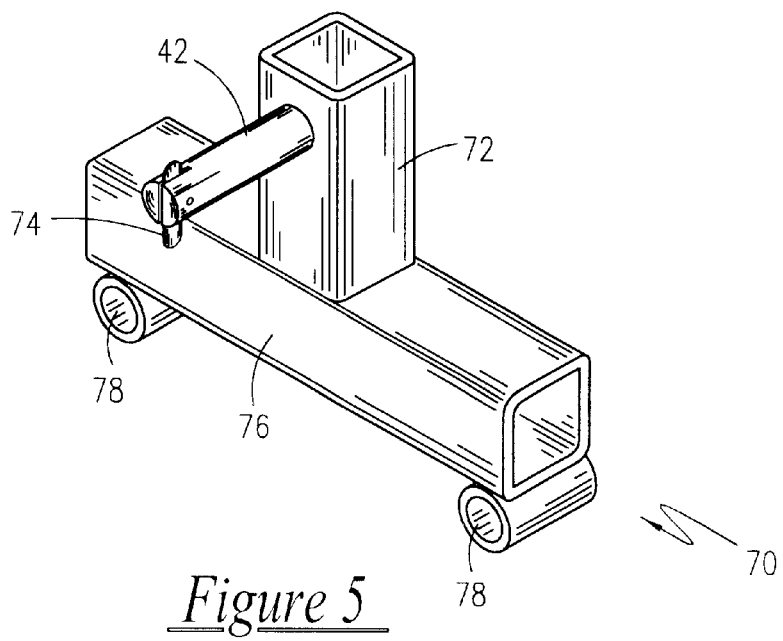
FIG. 5 is a perspective view of a single bracket 70 as used with the installation tool system for pole-mounted communication cables of the present invention

The double side-by-side roller assembly 40 as mounted and secured by the hanger bracket 24 is used when pairs of communication line are to be installed. When only one communication line is to be installed, a single bracket 70, as shown in FIG. 5, can be used in conjunction with a modular roller assembly as will be described in greater detail below. The single bracket assembly 70 attaches to a support channel 28a (or, alternately, 28b), which receives and retains an attachment pin 42, shown protruding from a bracket channel 72, and secured by the use of a locking toggle means 74. The locking pin means 74 is shown here as the type well known and readily available, but those familiar with the existing art can readily see that other forms of locking and securing methods can also be used and thus should not be seen as a limiting factor. The bracket channel 72 supports a horizontal support bar 76. The support bar 76 forms and supports a pair of attachment orifices 78 at each lateral end and spaced apart a standard distance to receive a modular roller of the type to be described herein below.

Figure 6:
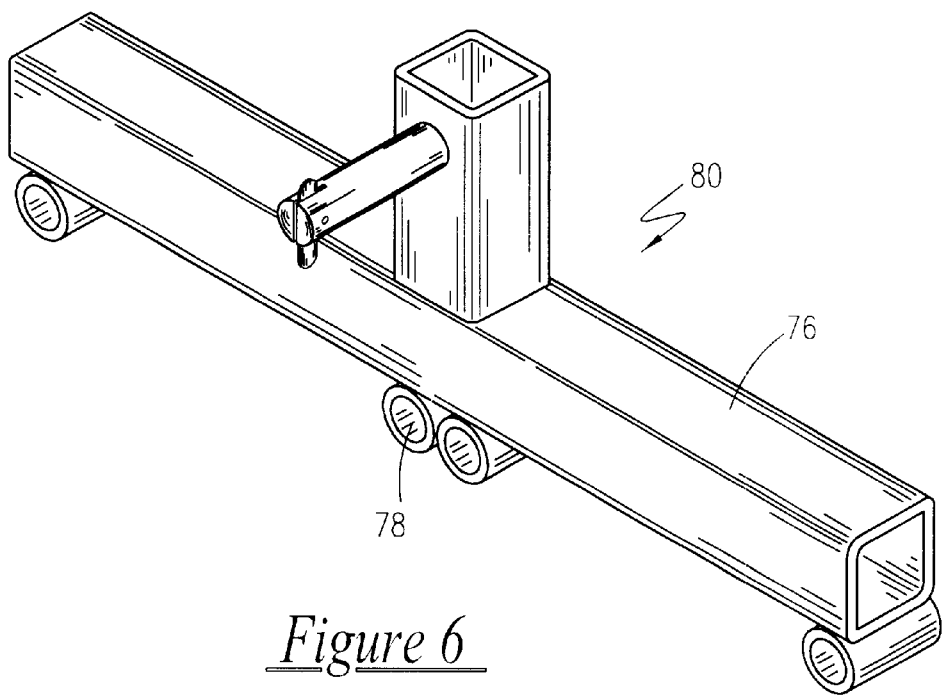
FIG. 6 is a perspective view of a double bracket 80 as used with the installation tool system for pole-mounted communication cables of the present invention.

Similarly, FIG. 6 depicts a double bracket 80 that can be used in conjunction with a plurality of modular roller assemblies as will be described in greater detail below. The double bracket assembly 80 attaches to a support channel 28a (or, alternately, 28b) in a similar manner; however, the support bar 76 supports a number of pairs of attachment orifices 78, each pair spaced apart a standard distance to receive a modular roller of the type to be described herein below.

Figure 7:
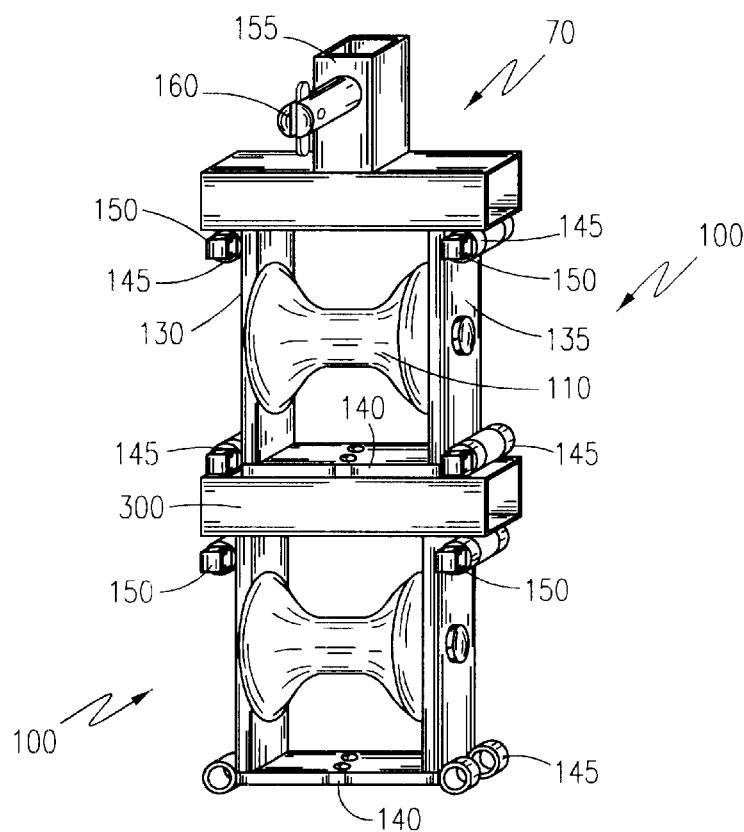
FIG. 7 is a perspective view of a perspective view of a single bracket 70 shown attached to a two modular roller assemblies 100 in the vertical position as used with the installation tool system for pole-mounted communication cables.
Figure 8:
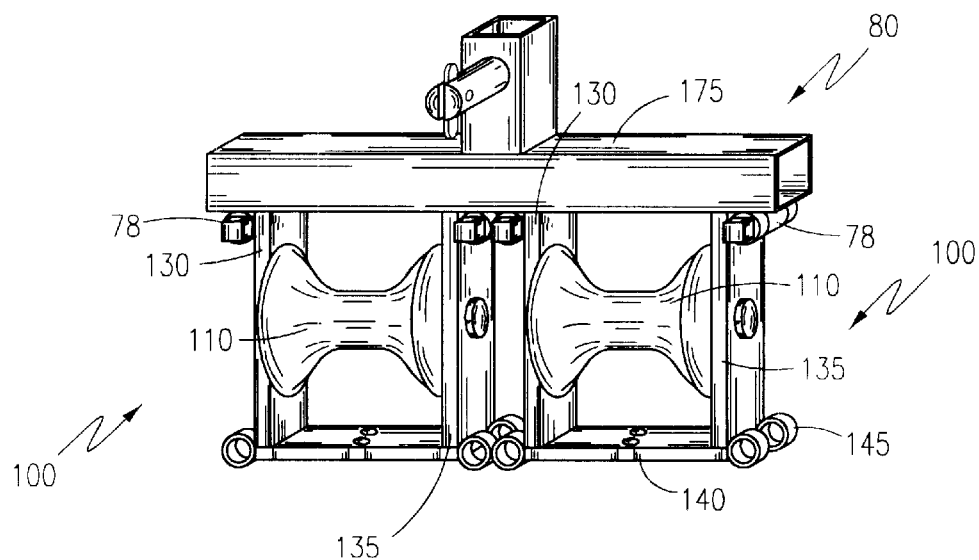
FIG. 8 is a perspective view of a double bracket 80 shown attached to two modular roller assemblies 100 in the horizontal position as used with the installation tool system for pole-mounted communication cables.

Referring now to FIG. 7, a perspective view of a single bracket 70 shown attached to two modular roller assemblies 100. Similarly, and in conjunction with FIG. 8, a double bracket 80 shown attached to two modular roller assemblies 100. In each of these Figures, a series of modular rollers 100 are attached to the attachment orifices 78 by use of a modular, interchangeable attachment bolt connector 150. Each modular roller assembly 100 consists of a first side piece 130 and a second side piece 135 connected together by a bottom assembly 140. In each corner or end of the first side piece 130 and the second side piece 135 is a bolt retaining collar 145 to allow all components to be secured via a modular bolt connector 150. The bottom of the modular roller 100 is thereby capable of having attached a connector element 300, 310, or 320 as shown in FIGS. 11a, 11b, and 11c, respectively, so that other modular rollers 100 can be attached there beneath.

Figure 9:
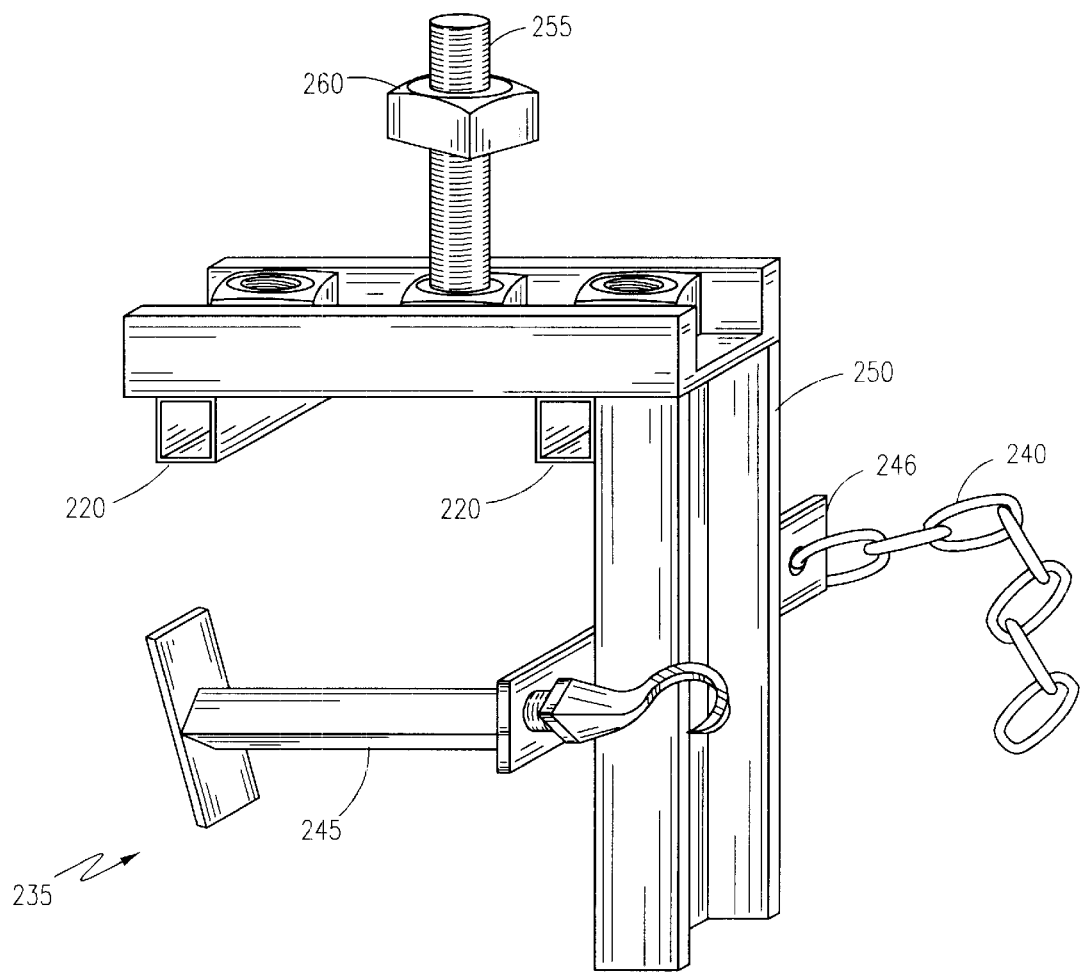
FIG. 9 is a perspective view of a temporary pole mount bracket 235 as used with the installation tool system for pole-mounted communication cables.

Referring now to FIG. 9, a perspective view of a temporary pole mount bracket 235 as used with the installation tool system for pole-mounted communication cables is depicted. The pole mount bracket 235 is used to attach other components of the installation tool system for pole-mounted communication cables to round poles, preferably wooden telephone poles. The main attachment is made via a chain 240, which wraps around the wooden pole, (not shown in this view) as will be shown herein below. The chain 240 secures onto itself and is tightened via the use of a securing mechanism 245. The securing mechanism 245 also holds an "U"-shaped bracket 250, to which two square attachment support channel 220 (similar to support channel 28A and 28B) are provided on the upper structure. Also located on the securing mechanism is a bolt stud 255 and a nut 260, which are used to secure other components of the installation tool system for pole-mounted communication cables which will be disclosed herein below.

Figure 10:
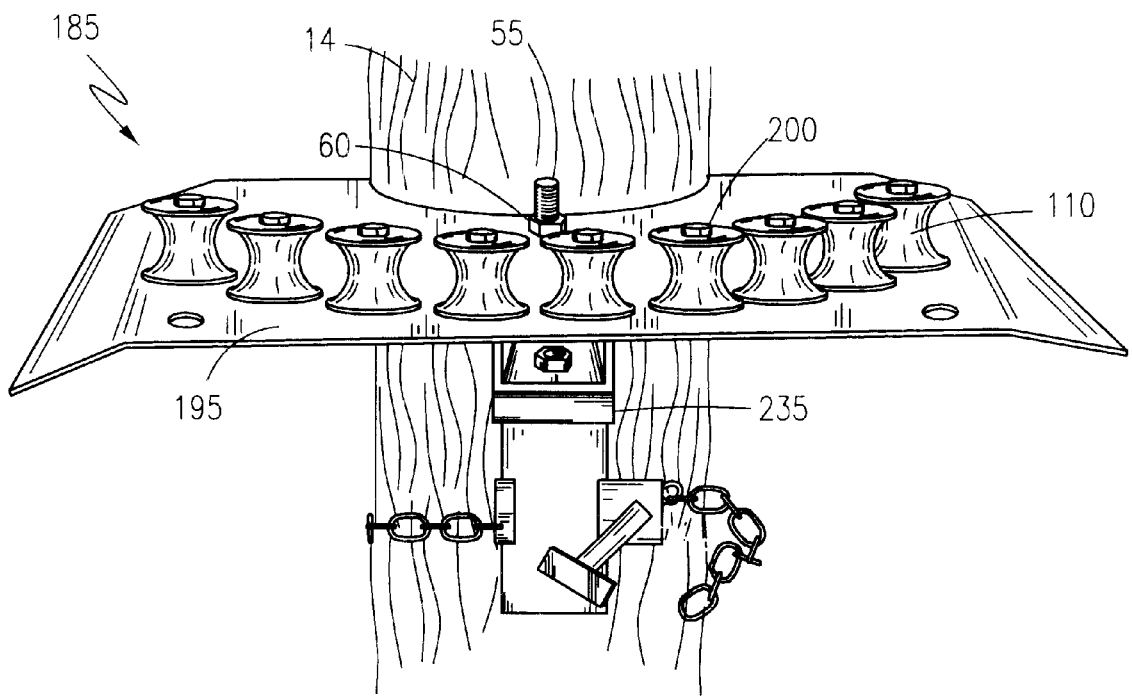
FIG. 10 is a perspective view of a pole mounted corner roller system 185 as used with the installation tool system for pole-mounted communication cables.

Referring next to FIG. 10, a perspective view of a pole mounted corner roller system 185 as used with the installation tool system for pole-mounted communication cables is depicted. The pole mounted corner roller system 185 is mounted on a wooden pole 14 as shown, though any type of circular pole would work equally well. The pole mounted corner roller system 185 is fastened to the pole with the use of the pole mount bracket 235 as shown. The bolt stud (⅝" USS) 55 is shown attached to a roller plate 195 of the pole mounted corner roller system 185 and secured with a nut 60 as shown. Attached to the roller plate 195 are a total of nine (9) rollers 110, each secured by a roller plate mounting bolt 200. The rollers 110 are allowed to turn freely on the roller plate 195, thus allowing any communication cable that is being installed along or around the wooden pole 14, to do so in a manner which does not damage it. Such an arrangement could be used at any outside corner, such as the exterior corner of a building, house or structure as well. It may also be rotated 180° for inside corners.

Figure 11A:
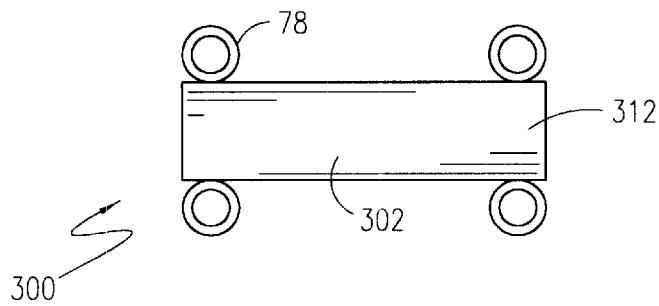
FIG. 11A through FIG. 11C are perspective views of connector bars 300, 310 and 320 shown in a 1:1, 2:1, and 2:2 configuration, respectively.
Figure 11B:
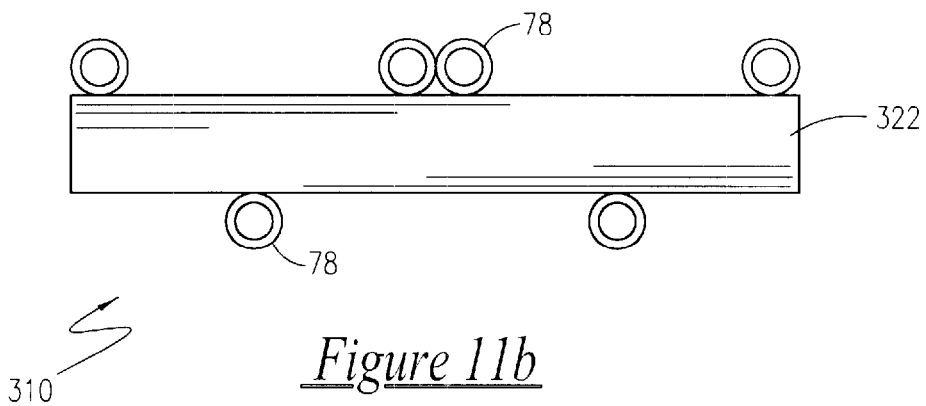
Figure 11C:
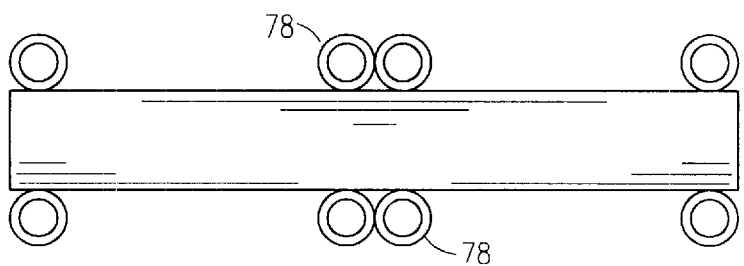

Finally, referring to FIG. 11A through FIG. 11C and FIG. 12, miscellaneous connector elements are depicted that allow the above described span-end elements to be used interchangeably, modularly, and adaptable. In FIG. 11A, a 1:1 modular roller assembly connector 300 is shown having a lateral support bar 302. The lateral support bar 302 separates an upper surface from a lower surface, and at each end thereof are a pair of series attachment orifices 78. Along both the upper surface and lower surface each respective pair of attachment orifices 78 are separated by a fixed distance corresponding to the overall width of the modular rollers 100, which can be thereby attached by the use of a modular, interchangeable attachment bolt connector 150 of FIG. 12. In this particular configuration, a single modular roller 100 can be attached to and extended from another single modular roller 100. In FIG. 11B, a 2:1 modular roller assembly connector 310 is shown having a lateral support bar 312. The lateral support bar 312 separates an upper surface from a lower surface, and a series of attachment orifices 78 are affixed along both the upper surface, and separated by a fixed distance so as to allow for attachment of a pair of modular roller assemblies 100, and along the lower surface is a single such pair of attachment orifices 78 that are separated by a fixed distance corresponding to the overall width of the modular rollers 100. In such a configuration, a pair of single modular rollers 100 can be attached beneath a single such roller, or a single such roller 100 can be attached beneath a pair of such rollers 100. Similarly, in FIG. 11C a 2:2 modular roller assembly connector 320 is shown with connections for a pair of modular rollers 100 at the top and a pair of modular rollers 100 at the bottom. Although many cables can be supported through a single roller assembly 100, the use of these variously shaped connectors allows the user the adaptability of pulling a plurality of cable configurations in a manner that keeps the cables individually, relatively aligned by using an individual roller for each cable.

Figure 12:
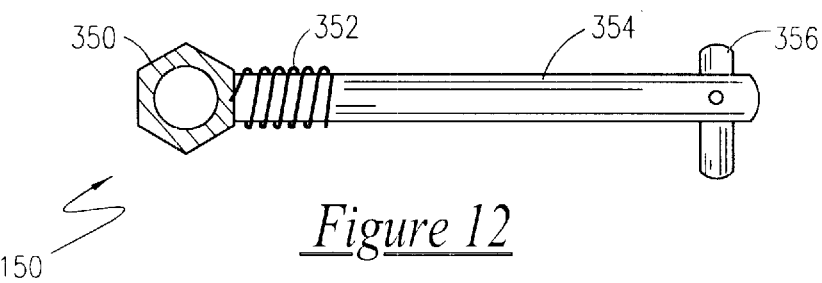
FIG. 12 is a perspective view of a modular bolt connector 150 for use therewith.
Figure 13A:
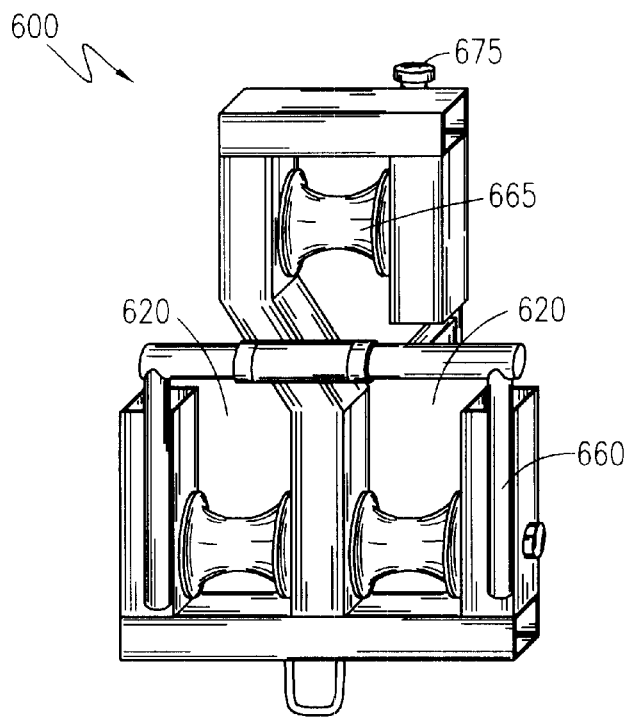
FIG. 13A and FIG. 13B are perspective views of a double roller assembly 600 for mounting to a messenger cable as used with the installation tool system for pole-mounted communication cables.
Figure 13B:
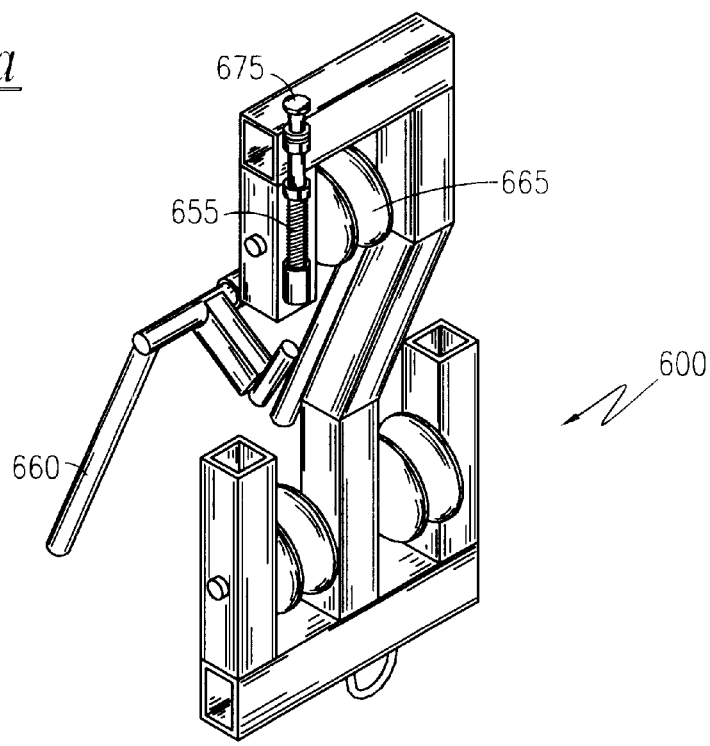

Finally, FIG. 12 depicts one typical example of an anticipated modular bolt connector 150. Although any similar configurations to perform the necessary function can be adapted, for purposes of disclosure shown herein is a handle 350 terminating one end of a shaft 354 with a release spring 352 attached thereto along the shaft 354. The shaft is envisioned as having at least two inches of useable space, with the spring 352 used to bias the handle 350 outward when installed. A locking means, shown herein as a pivoting toggle 356, is affixed at the end of the shaft 354 opposite the handle 350 for selectable locking or releasing the pin 150 from within an attachment orifice 78.

2. Detailed Description of the FIGS. 13–15 . Mid-Span Elements

Although many of the above elements can be adapted for mid-span use, i.e. pulling of communication cable along a messenger 12 when routing between poles 14, a of series specifically adapted mid-span elements are also provided. Particularly, FIGS. 13a and 13b indicate a double roller assembly for mounting to a messenger cable as used with the installation tool system for pole-mounted communication cables. The double roller cable support assembly 600 provides for the installation of cables as described by the double side-by-side roller assembly in a closed type arrangement. However, a spring assembly 655 allows for the opening and closing of the two cable openings 620 by the use of a closing fork assembly 660. The closing fork assembly 660 thus provides the security of cable entrapment and mounts on the messenger with ease. The installer simply has to raise or lower the single module cap piece 675 to add or remove cables or remove from the strand. An upper support roller 665 allows the double roller cable support assembly 650 to be installed along a messenger wire.

Figure 14A:
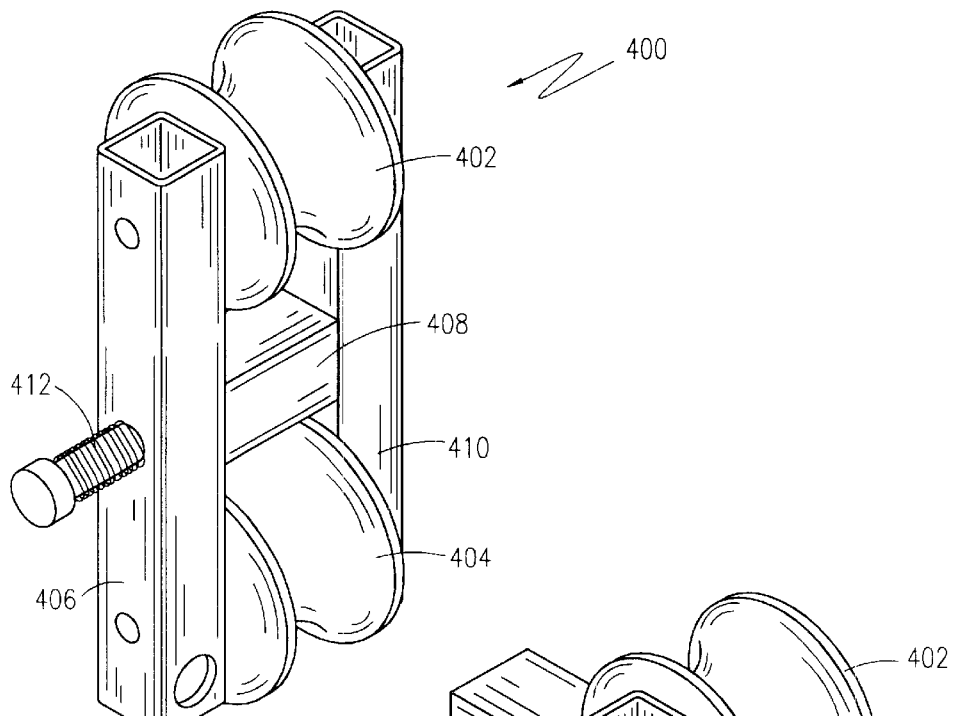
FIG. 14A and FIG. 14B are perspective views of a single mid-span roller 400 for guiding a single communication cable.
Figure 14B:
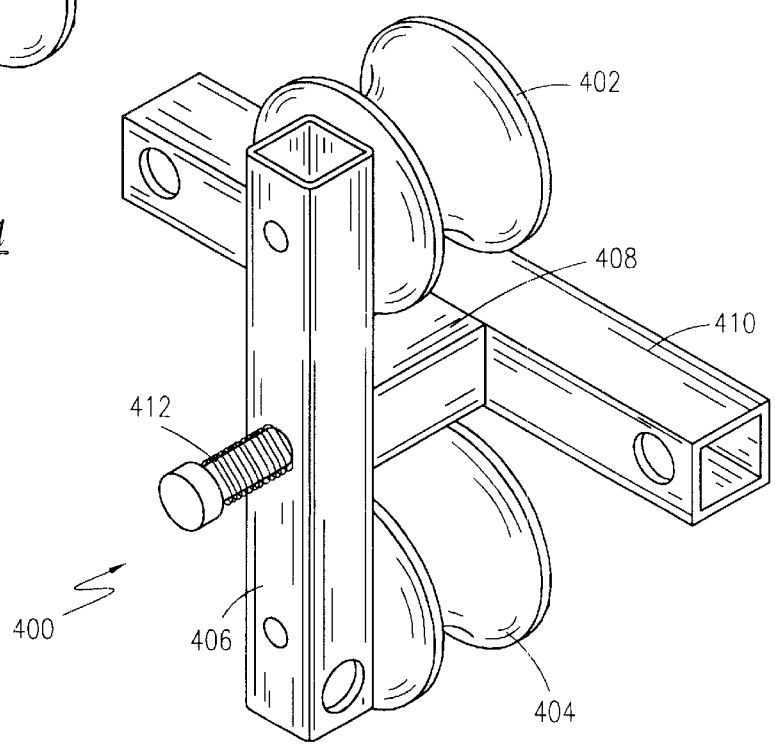
Figure 15:
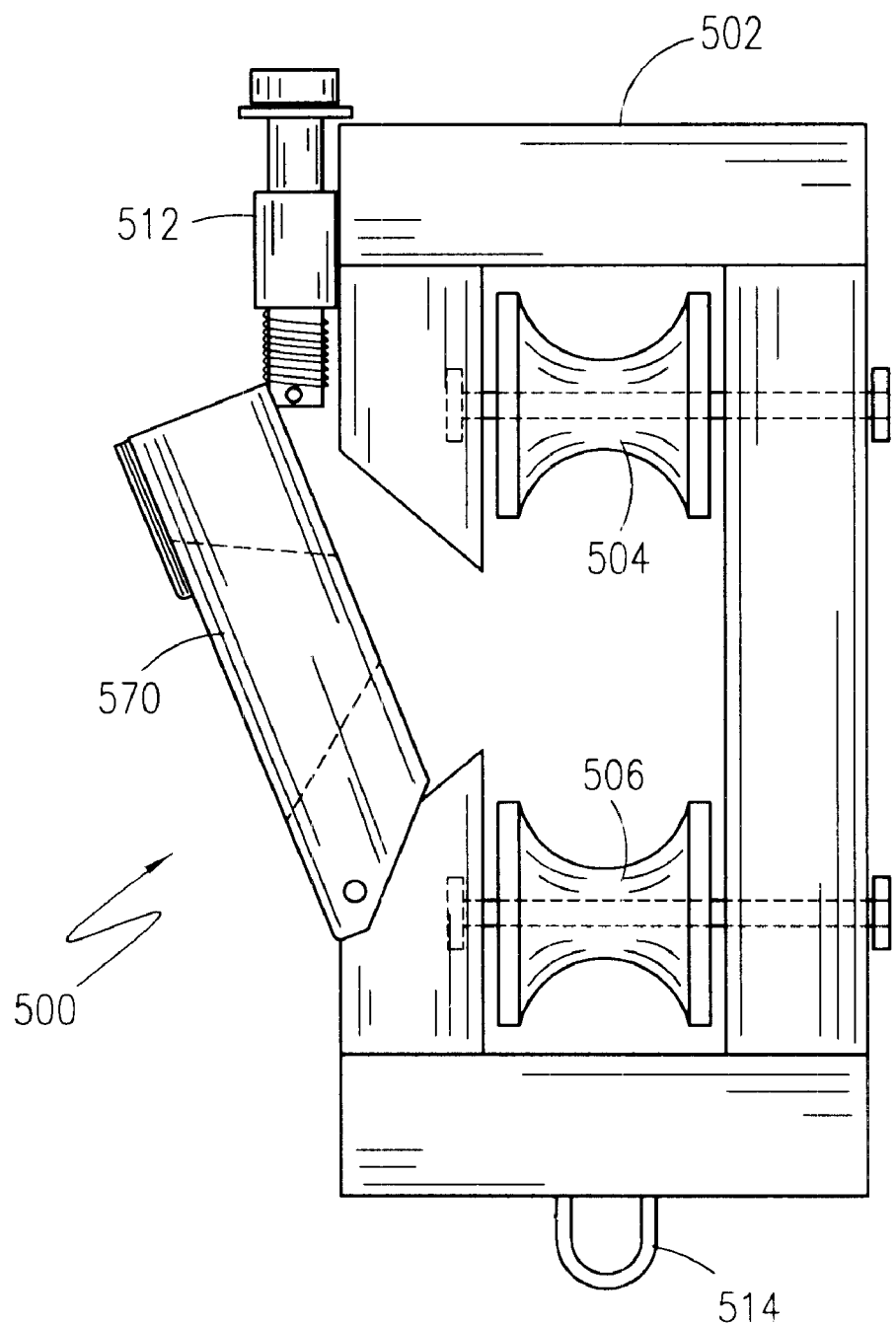
FIG. 15 is a perspective view of a single overlash roller 500.

Referring now to FIG. 14A and FIG. 14B, a single mid-span roller 400 for guiding a single communication cable is shown. As shown, an upper roller 402 and lower roller 404 are rotatably mounted to a first frame element 406 in a secure manner. Separating the upper roller 402 and lower roller 404 is a center pivoting mounting 408. A second frame element 410 is pivotally affixed to the first frame element 406 at the center pivoting mounting 408, and is locked in place by a locking spring 412 that provides a compressive urging force.

Finally, FIG. 15 is a perspective view of a single overlash roller assembly 500. Similar to the single mid-span roller 400, the overlash roller 500 has a unitary "C" shaped frame member 502 rotatably supporting an upper roller 504 for accepting an existing communication cable rather than a messenger (although the assembly 500 may be adapted for use on a messenger as well). A lower roller 506 allows a communication cable to be slidably pulled therethrough. A pivoting locking bar 570 is affixed to the frame 502 in a manner to provide a physical barrier to the open end, and a spring urged locking means 512 allows for secure closure of the locking bar 570. Finally, a pulling eyelet 514 affixed to the lowermost portion of the frame 502 allows attachment of a rope or guide to pull the roller assembly 500 into position mid-span.

3. Operation of the Preferred Embodiment

The present invention and system is designed with ease of operation features in mind that allow it to be setup and utilized by a common individual with little or no training, and operated in a transparent and intuitive manner with respect to other cable installing devices.

Figure 16:
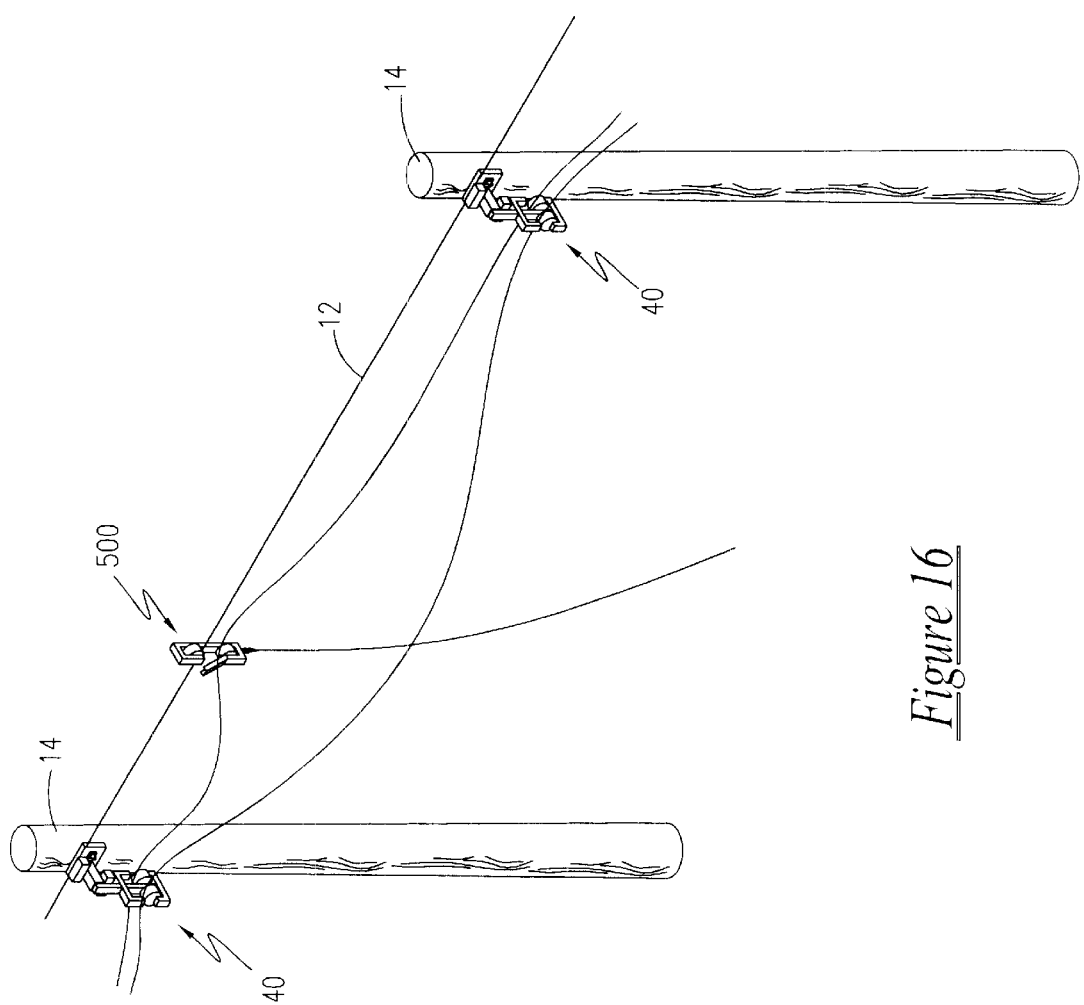
FIG. 16 is an overall perspective view showing use of the present invention.

To use the present invention as shown in FIG. 16, the user would first survey the installation site in person, or with the aid of engineered installation drawings, to determine the type, quantity and proper location of installation tool system for pole-mounted communication cables to be installed. It is envisioned that the primary components of the installation tool system for pole-mounted communication cables to be installed would vary widely from job situation to job situation, but would include both bolt mount bracket 24 and pole mount bracket 235 as the primary means of support. Next, various components would be attached to the bolt mount bracket 24 and the pole mount bracket 235. If these main components should not suffice for the particular installation, the installer may elect to construct a specialized pulling module based upon the descriptions provided for above. At this point, the installer is ready to install the actual communication cable.

The rope would be threaded though the various cable openings of the various components starting with the first, and moving along in a consecutive manner until the last point is reached. Then the cable is pulled in using a winch. At this point, a slight amount of tension is left on the cable spool. The cable is then lashed to the messenger and cut. The cable is then terminated, the various components of the installation tool system for pole-mounted communication cables removed, and the installation of the communication cable is completed with no damage to the cable, or risk to the installer, and at decreased overall costs compared to conventional installation methods.

The foregoing description is included to illustrate the operation of the preferred embodiment and is not meant to limit the scope of the invention. The scope of the invention is to be limited only by the following claims.

What is claimed is:

1. An Installation tool system for pole-mounted communication cables comprising:

a messenger clamp for use in affixing a messenger cable to a utility pole, said messenger clamp comprising a horizontally elongated messenger clamp housing forming a messenger receiving conduit for allowing passage a messenger cable laterally therethrough;

a pole support bolt for affixing said clamp housing to said pole;

an impingement blade for mating to an outer surface of said clamp housing and forming a physical retention means to prevent said messenger cable from releasing from said receiving conduit;

a first messenger retaining bolt and a second messenger retaining bolt each penetrating said clamp housing and said impingement blade so as to provide physical impingement therebetween;

a hanger bracket for attaching directly to said messenger clamp, said hanger bracket comprising a horizontally elongated bracket body;

a first support channel on an upper surface aligned perpendicularly to a lateral centerline of said bracket body;

a second support channel supported by said bracket body on a lower surface, aligned perpendicularly to said lateral centerline of said bracket body;

first attachment means attached at one lateral end of said bracket body; and second attachment means attached at an opposite lateral end of said body; and modular roller assembly means secured by said hanger bracket.

2. The system of claim 1, wherein said modular roller assembly means comprises a double side-by-side roller assembly, wherein said first support channel receives and retains an attachment pin protruding from an attachment connector and is secured by use of a first key pin and a first locking pin, wherein said second support channel receives and retains an attachment pin protruding from an attachment connector and is secured by use of a first key pin and a first locking pin.

3. The system of claim 2, wherein said modular roller assembly further extends downward from said attachment pin in a double side-by-side frame, said frame designed to allow for passage and pulling of communication cable and an associated pulling rope.

4. The system of claim 3, wherein said frame comprises a lower roller assembly engaging with an upper clamping assembly, said lower roller assembly comprising a lower frame member supporting a trio of parallel, upwardly projecting roller supports supporting a pair of rotatable rollers.

5. The system of claim 4, wherein said upper clamping assembly comprises an upper frame member supporting a pair of parallel, downwardly projecting roller closures, each roller closure engaging with an aligned roller support and having an outermost roller support extend upward with an insertion tab that extends into a hollow chamber within the roller closures.

6. The system of claim 5, wherein said upper clamping assembly further comprises guide means that causes positive engagement and closure of said lower roller assembly, thereby preventing any lateral slippage during the physical act of stringing communication cable.

7. The system of claim 5, wherein said upper clamping assembly further comprises a center guide support that allows for said lower roller assembly to slidably engage with said upper clamping assembly.

8. The system of claim 5, wherein said upper clamping assembly further comprises fastening means to secure said lower roller assembly to said upper clamping assembly.

9. The system of claim 1, wherein said modular roller assembly means comprises a single bracket assembly attached to a support channel which receives and retains an attachment pin and secured by the use of locking pin means.

10. The system of claim 1, wherein said modular roller assembly means comprises a double bracket that can be used in conjunction with a plurality of modular roller assemblies, said double bracket assembly attaching to said first support channel or said second support channel, thereby supporting a number of pairs of attachment orifices, each pair spaced apart a distance to receive a modular roller.

11. The system of claim 10, wherein said modular roller assembly means comprises a first side piece and a second side piece connected together by a bottom assembly, wherein in each end of said first side piece and said second side piece is a bolt retaining collar to allow all components to be secured via a modular bolt connector.

12. The system of claim 1, further comprising:

a temporary pole mount bracket for attachment to a pole via a chain which wraps around said pole and secures onto itself and is tightened via the use of a securing mechanism, said securing mechanism also holding a "U"-shaped bracket to which two square attachment support channels are provided on an upper structure.

13. The system of claim 1, further comprising:

a pole mounted corner roller system, wherein said pole mounted corner roller system comprises a roller plate having nine rollers, each said roller secured by a roller plate mounting bolt and are allowed to turn freely on said roller plate, thus allowing any communication cable that is being installed along or around the wooden pole in a manner which does not damage it.

14. The system of claim 1, further comprising elements adapted for mid-span use, said elements for mid-span use comprising:

a double roller messenger support assembly having a housing urged closed by a spring assembly to allow for the opening and closing of two cable openings by the use of a closing fork assembly, wherein said closing fork assembly provides the security of cable entrapment and mounting on said messenger clamp.

15. The system of claim 1, further comprising elements adapted for mid-span use, said elements for mid-span use comprising:

a single mid-span roller for guiding a single communication cable having an upper roller and lower roller rotatably mounted to a first frame element, and wherein separating said upper roller and said lower roller is a center pivoting mounting; and a second frame element pivotally affixed to the first frame element at said center pivoting mounting, and is locked in place by a locking spring that provides a compressive urging force.

16. The system of claim 1, further comprising elements adapted for mid-span use, said elements for mid-span use comprising:

a single overlash roller assembly having a unitary "C" shaped frame member forming an open end and rotatably supporting an upper roller for accepting an existing communication cable rather than said messenger cable;

a lower roller allowing a communication cable to be slidably pulled therethrough;

a pivoting locking bar affixed to said frame in a manner to provide a physical barrier to said open end; and spring urged locking means for allowing secure closure of said locking bar.

* * * * *